(12) United States Patent
Rigor et al.

(10) Patent No.: US 10,779,028 B2
(45) Date of Patent: Sep. 15, 2020

(54) PROGRESSIVE DELIVERY OF TARGETED THIRD-PARTY CONTENT

(71) Applicant: Verizon Digital Media Services Inc., Dulles, VA (US)

(72) Inventors: Paul Rigor, Los Angeles, CA (US); Brian W. Joe, Irvine, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 0 days.

(21) Appl. No.: 16/106,251

(22) Filed: Aug. 21, 2018

(65) Prior Publication Data

US 2020/0068242 A1    Feb. 27, 2020

(51) Int. Cl.
| | | |
|---|---|---|
| *H04N 21/2668* | (2011.01) | |
| *H04N 21/239* | (2011.01) | |
| *H04N 21/44* | (2011.01) | |
| *H04N 21/231* | (2011.01) | |
| *H04N 21/258* | (2011.01) | |
| *H04N 21/2747* | (2011.01) | |

(52) U.S. Cl.
CPC ..... *H04N 21/2668* (2013.01); *H04N 21/2393* (2013.01); *H04N 21/23109* (2013.01); *H04N 21/25841* (2013.01); *H04N 21/2747* (2013.01); *H04N 21/44008* (2013.01)

(58) Field of Classification Search
CPC ........... H04N 21/2668; H04N 21/2393; H04N 21/44008; H04N 21/23109; H04N 21/25841; H04N 21/2747
See application file for complete search history.

(56) References Cited

U.S. PATENT DOCUMENTS

2003/0046690 A1 *   3/2003   Miller .................... H04H 20/10
                                                                725/36

* cited by examiner

*Primary Examiner* — Yassin Alata
(74) *Attorney, Agent, or Firm* — Ansari Katiraei LLP; Arman Katiraei; Sadiq Ansari

(57) ABSTRACT

The progressive delivery of targeted secondary content may include determining that primary content requested from a particular distribution point of a distributed platform includes a first tag to integrate targeted secondary content as part of an initial presentation of the primary content, and a second tag to integrate targeted secondary content outside the initial presentation. The progressive delivery may further include modifying the primary content by replacing the first tag so that the primary content and targeted secondary content for the initial presentation (e.g., third-party content associated with the first tag) are provided from the particular distribution point without accessing a third-party content provider, while targeted secondary content outside the initial presentation (e.g., third-party content associated with the second tag) may be selected and provided by one or more third-party content providers as originally specified in the primary content.

14 Claims, 7 Drawing Sheets

150 # PROGRESSIVE DELIVERY OF TARGETED THIRD-PARTY CONTENT

BACKGROUND ART

Content publishers produce primary content for consumption by client devices. The primary content may include videos, web pages, services, images, audio, text, applications, games, and/or other digital assets. Network enabled client devices may access the primary content via the Internet and/or other digital networks.

Since the primary content often travels over several network hops to arrive at a client device, the user experience may hinge on how fast the primary content can be delivered to the client device. If the primary content takes too much time to arrive at the client device, especially with respect to an initial presentation of the primary content, the client device may switch to alternate content, fail to complete a transaction, or simply abort the request.

Content publishers may rely on one or more content delivery networks ("CDNs") for the delivery of their primary content. A CDN may be a distributed platform that caches and serves the same content to client devices at different network locations or geographic regions from points-of-presence ("PoPs") closest to those network locations or geographic regions. In other words, the CDN provides a redundant and scalable architecture that can accommodate a large volume of content requests, and can deliver the requested content over fewer network hops than if the content was hosted and served from a single location.

Despite the efficiency with which a CDN may deliver primary content of a content publisher to a client device, the presentation of that primary content may be delayed because the content publisher integrates secondary content as part of the primary content, and the secondary content may be delivered from outside the CDN by independent third-party content providers. Content publishers may integrate secondary content (e.g., advertisements) to monetize their primary content, and/or provide proprietary third-party content (e.g., social media feeds, news feeds, third-party services, etc.) to enhance their primary content.

The delivery of the secondary content may be delayed relative to the primary content that is delivered by the CDN, because of the smaller delivery footprint and fewer resources of the third-party content provider relative to the CDN, and/or because of the targeted selection of the secondary content. For instance, secondary party content, such as advertisements, may be targeted on an individual user or client device basis. The targeted secondary content or advertisements may be selected based on user and/or session information (e.g., prior search history, age, location, income, etc.) that the third-party content provider obtains and analyzes before providing the secondary content or advertisements. There may be delay associated with obtaining the user and/or session information. There may be further delay associated with a real-time bidding process used for the secondary content selection. The real-time bidding process may involve different advertisers bidding against one another to have their advertisements (e.g., secondary content) delivered to users that meet their advertisement demographic or criteria. The bidding may occur in real-time in response to the third-party content provider receiving a request for secondary content. The secondary content of the highest bidder may then be selected and sent from the third-party content provider to the client device. These and other delays may cause the targeted secondary content to arrive at a client device well after (e.g., hundreds of milliseconds to several seconds) the primary content, that integrates the secondary content, is delivered to the client device by the CDN.

In some cases, the client device may be unable to render a presentation until the client device receives all content for that presentation. Therefore, if an initial presentation includes both primary content and secondary content, the initial presentation may be contingent on the last arriving content, thereby nullifying the performance of the CDN and degrading the user experience.

In other cases, the client device may be able to render the initial presentation based on the CDN delivered primary content without the later arriving secondary content. In these cases, the initial presentation appears incomplete, and the user experience may be interrupted as the later arriving secondary content is subsequently rendered after the initial presentation of the primary content. For instance, the addition of the secondary content after the initial presentation may cause objects within the initial presentation to shift, move, or otherwise change.

DETAILED DESCRIPTION

Systems and methods provide for the progressive delivery of targeted secondary content that is included as part of requested primary content. Primary content may include videos, web pages, services, images, audio, text, applications, games, and/or other digital assets that incorporate secondary content, via hyperlinks, tags, and/or references, as part of one or more presentations of the primary content. The secondary content may include advertisements or other content that is originated or served from a different source than the primary content.

The progressive delivery may include providing the requested primary content from a distributed platform, and selectively providing targeted secondary content, that integrates as part of the primary content, from the same distributed platform, rather than a third-party content provider. In particular, the distributed platform may replace tags that reference third-party content providers in the requested primary content so that the distributed platform may select and deliver targeted secondary content referenced by the tags without the requesting client device or the distributed platform accessing the referenced third-party content providers.

The progressive delivery may be provided for a first set of targeted secondary content that impacts an initial presentation of primary content. The selection and delivery of a second set of secondary content, that is integrated outside the initial presentation, may be unmodified and provided by the one or more third-party content providers that were originally referenced in the primary content for the delivery of that secondary content. The initial presentation may be defined to include one or more secondary content that is presented with an initial rendering of the primary content.

The progressive delivery may ensure that slower and/or unreliable performance from a third-party content provider does not adversely impact the initial presentation on the client device. Rather, all content for the initial presentation, including the primary content and any secondary content integrated as part of the initial presentation, may be provided by the distributed platform. The progressive delivery may also improve the user experience by expediting selection of the targeted secondary content for the initial presentation. The progressive delivery may expedite selection of the targeted secondary content by basing the selection on locations of the distributed platform points-of-presence ("PoPs"). The progressive delivery thereby avoids the more time-consuming process of obtaining user and/or session identifying information, and using that information to directly select targeted secondary content, or indirectly select targeted secondary content via a real-time bidding or other process.

Figure 1:
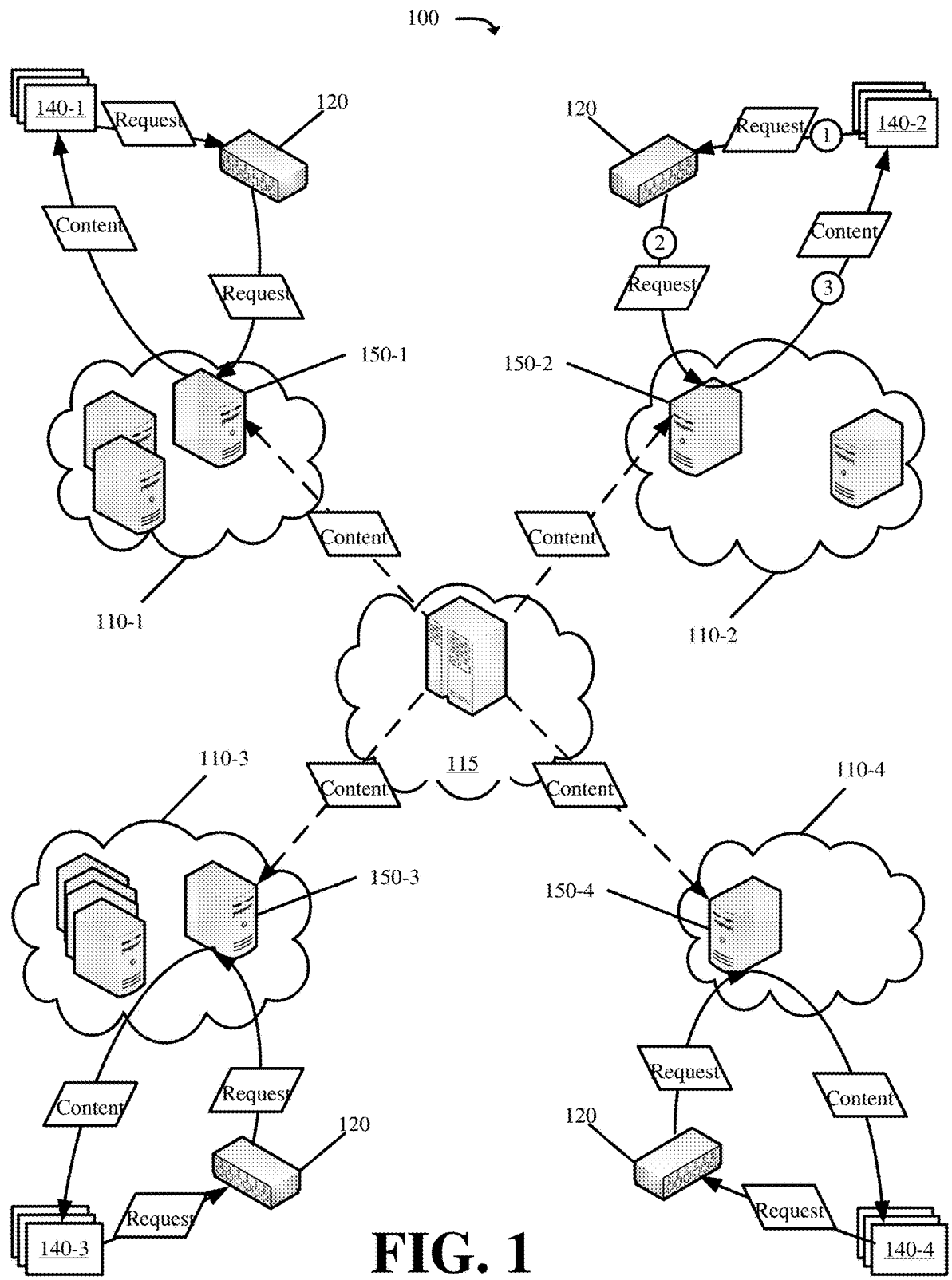
FIG. 1 conceptually illustrates an example distributed platform infrastructure for performing the progressive delivery of the targeted third-party content.

FIG. 1 conceptually illustrates example distributed platform 100 for performing the progressive delivery of targeted secondary content. Distributed platform 100 may represent a content delivery network ("CDN") or other cloud-based system that hosts and distributes primary content on behalf of different content publishers. Distributed platform 100 may include distribution points 110-1, 110-2, 110-3, and 110-4 (herein sometimes collectively referred to as "distribution points 110" or individually as "distribution point 110"), origin storage 115, and traffic management devices 120.

In the context of a CDN, each distribution point 110 represents a different PoP. Distribution points 110 may be located at different edges of the Internet or other large network. Distribution points 110 may be geographically separated from one another. Each distribution point 110 may include one or more content distribution servers 150, and may further include other machines such as load balancers (not shown).

One or more servers 150 of a distribution point (e.g., 110-1, 110-2, 110-3, and/or 110-4) can be separate physical machines, or a set of virtual machines running on a partitioned or shared set of resources of one or more physical machines. Servers 150 may be tasked with caching and/or delivering content of one or more content publishers and/or third-party content providers (e.g., advertisers) to client devices 140 that request the content from distributed platform 100. Content distribution servers 150 may run various processes that manage what content is cached, how content is cached, how content is retrieved from origin storage 115 when the content is not present in cache, and/or other processes related to hosting and serving content. For instance, server 150-1 operating from distribution point 110-1 may experience a cache miss in response an initial request for particular content that is not locally cached by server 150-1. The cache miss causes server 150-1 to query origin storage 115 for the particular content. One or more of servers 150 may also be configured for the progressive delivery of the targeted secondary content and/or for the dynamic modification of primary content to facilitate the progressive delivery of the targeted secondary content.

Content publishers may offload delivery of their primary content to the distributed platform by uploading their primary content to origin storage 115. Origin storage 115 may represent a centralized or distributed second-tier of storage in distributed platform 100. In some embodiments, origin storage 115 may include one or more servers from which to fan-out the primary content to distribution points 110. In some embodiments, origin storage 115 may retrieve primary content that was not uploaded to origin storage 115 or that is not cached by origin storage 115 from content publisher servers. As part of the progressive delivery described herein, origin storage 115 may also retrieve and store targeted secondary content from different third-party content providers.

Once server 150-1 at distribution point 110-1 retrieves primary content from origin storage 115, server 150-1 may provide the retrieved primary content to client device 140-1 in response to a request for that primary content from client device 140-1. Server 150-1 may also locally cache a copy of the primary content so that subsequent requests for the same primary content that are routed to distribution point 110-1 can be served from server 150-1 cache without accessing origin storage 115. When performing progressive delivery of secondary content for requested primary content, server 150-1 may also modify the primary content before serving it to client device 140-1. For instance, server 150-1 may modify tags to third-party content providers for secondary content that integrates in an initial presentation of the primary content. In some embodiments, server 150-1 may replace the third-party content provider tags that impact the initial presentation with tags for requesting targeted secondary content from the distributed platform. In some other embodiments, server 150-1 may embed, in the requested primary content, and in place of the third-party content provider tags that impact the initial presentation, targeted secondary content that is selected by server 150-1.

Traffic management devices 120 may route client devices 140, and more specifically, client device 140 issued requests for primary content to one of distribution points 110 that can optimally deliver the requested primary content back to requesting client device 140. An optimal distribution point is selected, based on geographic proximity, network congestion, available resources, and/or other factors, to provide fastest delivery of the requested primary content to client device 140 relative to other distribution points 110.

Different implementations utilize different traffic management schemes, such as Anycast routing or Domain Name System (DNS) routing, to distribute client device 140 issued requests to an optimal distribution point 110. Accordingly, traffic management device 120 can include different combinations of Doman Name System (DNS) servers, load balancers, and routers performing Anycast, Border Gateway Protocol (BGP), and/or other routing of requests and data packets.

Figure 2:
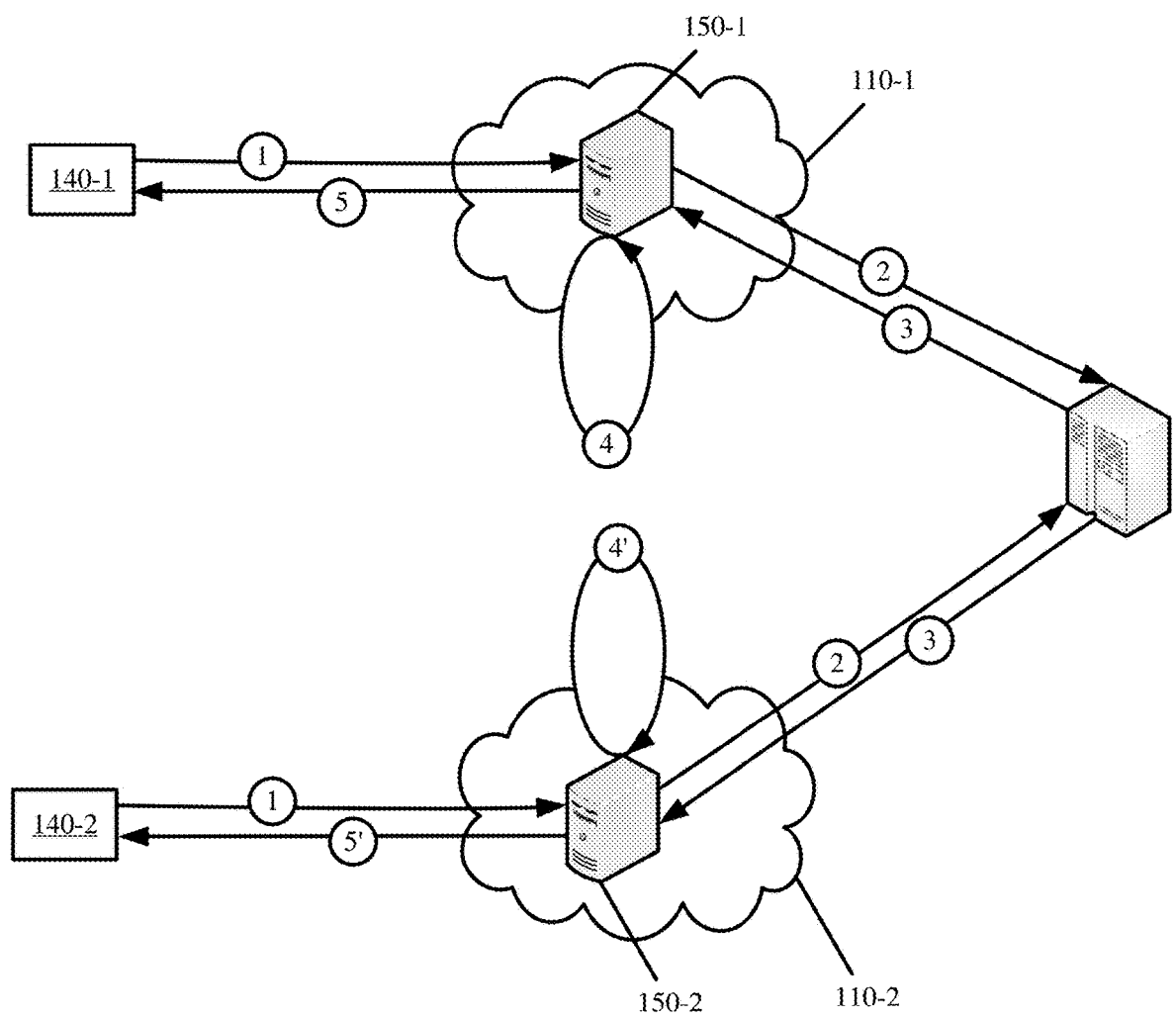
FIG. 2 illustrates performing the progressive delivery of targeted secondary content based on the different locations associated with different distribution points of a distributed platform.

FIG. 2 illustrates performing the progressive delivery of targeted secondary content based on the different locations associated with different distribution points of a distributed platform. In particular, FIG. 2 illustrates distributed platform 100 selecting and distributing targeted secondary content that is integrated as part of requested primary content based on the requests for the primary content arriving at different distribution points 110-1 and 110-2 and different locations associated with each distribution point 110-1 and 110-2.

As shown in FIG. 2, first client device 140-1 may establish a network connection server 150-1 in distribution point 110-1, and may issue (at 1) a request for primary content to server 150-1 using the established network connection. Similarly, second client device 140-2 may establish a network connection to server 150-2 in distribution point 110-2, and may issue (at 1) a request for the same primary content to server 150-2 using the established network connection.

The requests may be issued as Hypertext Transfer Protocol ("HTTP") GET requests with Uniform Resource Locators ("URLs") that are directed to the same primary content. The requests may be issued to the same Anycast Internet Protocol ("IP") address, domain name, URL, or other address.

The issued (at 1) requests may be directed to a base Hypertext Markup Language ("HTML") page for the requested primary content. The HTML page may define the framework, layout, and tags, links, and/or other references to the various content/objects that form the primary content. For instance, the HTML page may include one or more tags for retrieving the primary content (e.g., objects, text, images, media, services, applications, etc.) from distributed platform 100, and one or more tags for retrieving the secondary content, that is integrated into the primary content, from various third-party content providers.

The requests may result in cache misses at first server 150-1 and second server 150-2, because the requested primary content (e.g., HTML page) may not be cached by first server 150-1 or second server 150-2. Accordingly, first server 150-1 and second server 150-2 may issue (at 2) a request to retrieve the requested primary content from origin storage 115, and origin storage 115 may provide (at 3) the requested primary content to first server 150-1 and second server 150-2.

First server 150-1 and second server 150-2 may then parse the provided (at 3) primary content to determine that the content includes a tag, link, and/or other reference to secondary content, and that the tag, link, and/or other reference integrates the secondary content within an initial presentation of the primary content. The tag, link, and/or other reference may further identify a third-party content provider that operates independent of distributed platform 100. The third-party content provider may have an adverse impact on the initial presentation of the primary content when the secondary content is delivered from the third-party content provider with delay relative to the delivery of the primary content from distributed platform 100 (e.g., first server 150-1 to first client device 140-1, and second server 150-2 to client device 140-2).

Accordingly, first server 150-1 and second server 150-2 may perform progressive delivery for the tag to secondary content, that is integrated as part of the primary content initial presentation, to prevent the third-party content provider from delaying or otherwise impacting the initial presentation. In particular, first server 150-1 may select (at 4) first secondary content that is targeted for the first region serviced by distribution point 110-1 (e.g., a region that client device 140-1 operates within). Second server 150-2 may select (at 4') second secondary content that is targeted for the second region serviced by distribution point 110-2 (e.g., a region that client device 140-2 operates within).

Server 150-1 may then replace the tag in the primary content so that client device 140-1 receives (at 5) the first secondary content directly from distribution point 110-1, and integrates the first secondary content in the initial presentation of the primary content. The first secondary content is integrated as part of the initial presentation of the primary content without client device 140-1, server 150-1, or distribution point 110-1 accessing a third-party content provider in response to the request (at 1) from client device 140-1, or client device 140-1 accessing the third-party content provider for any secondary content that is integrated as part of the initial presentation of the requested primary content. Moreover, the secondary content is integrated as part of the initial presentation of the primary content even if client device 140-1 runs an advertisement blocker. Since the secondary content is provided with the primary content from distributed platform 100, the advertisement blocker is unable to identify the secondary content as content of a third-party content provider. Accordingly, the progressive delivery further ensures that secondary content served from distributed platform 100 will be presented on client device 140-1.

Similarly, server 150-2 may replace the tag in the primary content so that client device 140-2 receives (at 5') the second third-party content directly from distribution point 110-2, and integrates the second secondary content in the initial presentation of the primary content. In this case, the secondary content is integrated as part of the initial presentation of the primary content without client device 140-2, server 150-2, or distribution point 110-2 accessing a third-party content provider in response to the request (at 1) from client device 140-2, or client device 140-2 accessing the third-party content provider for any secondary content that is integrated as part of the initial presentation of the requested primary content.

For instance, the content publisher HTML base page retrieved (at 3) from origin storage 115 may include a tag for an advertisement. Server 150-1 may select and provide an advertisement of a particular advertiser that is specific to the first region, and server 150-2 may select and provide a different advertisement of the same particular advertiser that is specific to the second region. The advertisement specific to the first region may include images, messages, special offers, locations, times, and/or other information that are specific to the first region. The advertisement specific to the second region may include different images, messages, special offers, locations, times, and/or other information that are specific to the second region.

Each server 150-1 and 150-2 may obtain the selected advertisement from a set of active advertising campaigns that have been already uploaded to distributed platform 100, and that are cached either by servers 150-1 and 150-2, elsewhere within distribution points 110-1 and 110-2, and/or at origin storage 115. In any case, the advertisements (e.g., targeted secondary content) are provided from distributed platform 100 in response to the issued (at 1) requests for primary content from client devices 140-1 and 140-2, without delay or overhead associated with creating a new network connection to a third-party content provider, accessing the third-party content provider that may be more remote or slower than servers 150-1 or 150-2 of distributed platform 100, and/or waiting for real-time bidding or other content selection to occur. Instead, client devices 140-1 and 140-2 may receive the requested primary content and targeted secondary content, integrated as part of an initial presentation of the primary content, over the same network connection that is established to issue (at 1) the initial requests for primary content, and from a distribution point 110-1 or 110-2 of distributed platform 100 that is closest to or optimal for client devices 140-1 and 140-2.

In some embodiments, servers 150-1 and 150-2 directly embed (e.g., inline) data for the targeted secondary content in the retrieved primary content before the primary content is provided (at 5 or 5') to client devices 140-1 or 140-2. In some such embodiments, the data for the targeted secondary content is inserted in place of the tag, link, or other reference to the secondary content in the primary content. In some other embodiments, servers 150-1 and 150-2 replace the tag, link, or other reference to the secondary content with a new tag that causes client devices 140-1 and 140-2 to request secondary content from distributed platform 100 instead of a third-party content provider. In some such embodiments, client device 140-1 may receive the primary content, parse the primary content, identify the new tag for secondary content, and request the secondary content from distribution point 110-1 via the existing network connection to server 150-1. In either case, client devices 140-1 and 140-2 may be unaware of any changes that distributed platform 100 makes to the primary content (e.g., tag rewriting or tag replacement) to provide the progressive delivery of the targeted secondary content.

In FIG. 1, distributed platform 100 progressively delivers the secondary content for the primary content by internalizing the selection and delivery of a first set of secondary content, while leaving the selection and delivery of a second set of secondary content to one or more third-party content providers. The progressive delivery may differentiate the delivery of the first set of secondary content from delivery of the second set of secondary content based on the first set of secondary content including secondary content that is integrated as part of an initial presentation of primary content, and that is originally specified in the primary content as being provided by a first set of third-party content providers. Conversely, the second set of secondary content may include secondary content that is integrated outside the initial presentation of the primary content, and therefore does not impact the initial presentation.

The first set of secondary content for the initial presentation may be differentiated from the second set of secondary content based on a first tag or some initial number of tags, found in the primary content, that are directed to secondary content or content that is delivered by third-party content providers. The first set of secondary content may also be differentiated from the second set of secondary content by performing a virtual rendering of the primary content, and by determining which secondary content is presented as part of an initial rendering, an initial set of pixels, an initial visible set of content, and/or other initial presentation. The initial presentation may also be defined in terms of a threshold percentage or threshold amount of content (e.g., first 100 kilobytes of data, first three images, etc.).

Distributed platform 100 may perform the progressive delivery of the targeted secondary content so that the initial presentation of the primary content is rendered quickly and with high fidelity. The progressive delivery accelerates the initial presentation as a result of eliminating various delays associated with slower selection and slower delivery of targeted secondary content for the initial presentation by third-party content providers. The third-party content providers may provide slower selection of the targeted secondary content than distributed platform 100, because, as noted above, client devices 140 may first have to establish a new network connection to the third-party content provider, issue a request that may traverse more network hops to reach the third-party content provider, and/or the third-party content provider may obtain a large set of user specific data (e.g., age, income, and/or other user demographics) and/or session information (e.g., prior search history, prior purchases, prior logins, etc.) before selecting targeted secondary content. The user specific data may be obtained from cookies, database lookups, and/or other exchanges between the third-party content provider and the client device that take time, whereas the selection of targeted secondary content by servers 150 is based on locations of distribution points 110. Moreover, the third-party content provider may select the targeted secondary content using a lengthy real-time bidding process. The progressive delivery improves the fidelity of the secondary content because advertisement blockers running on client devices 140 may be unable to differentiate between the primary content of the content provider and the secondary content of third-party content providers when both content is delivered by distributed platform 100 (e.g., same server, domain, address, and/or source), both content is requested from distributed platform 100, or the secondary content is directly embedded as part of the primary content.

Since the user will likely spend some time viewing the initial presentation, the slower selection and delivery of targeted secondary content by third-party content providers may not impact the user experience outside the initial presentation of the primary content. Accordingly, the progressive delivery of targeted secondary content leaves the remainder of the primary content unchanged such that the third-party content providers may select and provide the targeted secondary content that is integrated as part of primary content falling outside the initial presentation.

Figure 3:
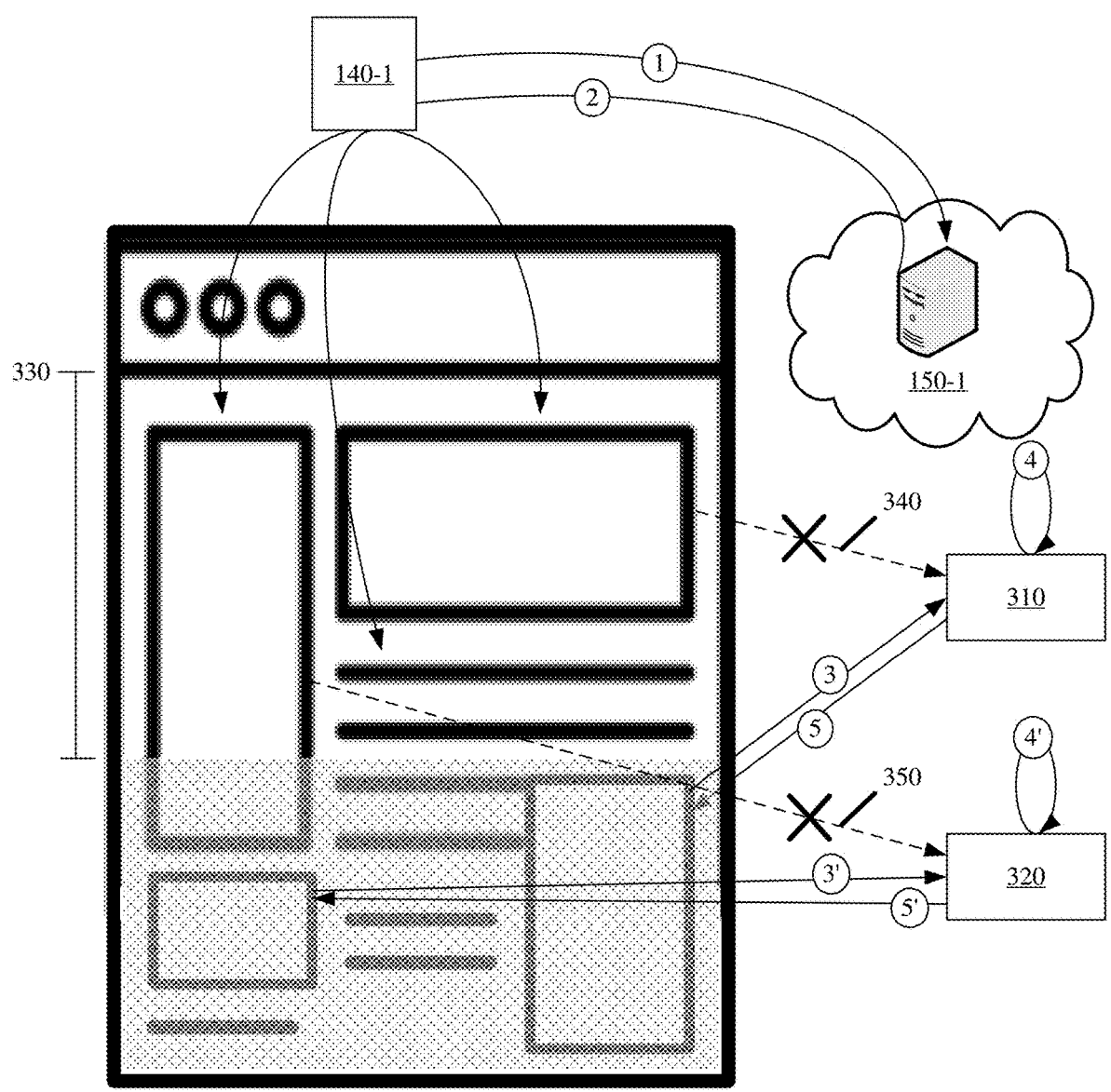
FIG. 3 conceptually illustrates the progressive delivery of targeted secondary content with a first set of secondary content for an initial presentation of primary content being provided by the distributed platform, and a second set of secondary content for a remaining presentation of the primary content being provided by one or more third-party content providers.

FIG. 3 conceptually illustrates progressive delivery of targeted secondary content with a first set of secondary content for an initial presentation of primary content being provided by the distributed platform, and a second set of secondary content for a remaining presentation of the primary content being provided by one or more third-party content providers. The figure illustrates client device 140-1, server 150-1 from distribution point 110-1 of distributed platform 100, and third-party content providers 310 and 320.

Client device 140-1 may issue (at 1) a request for primary content that is routed to server 150-1. Server 150-1 may obtain and parse the primary content. Server 150-1 may determine that initial presentation 330 of the primary content contains tags 340 and 350 for two different secondary content. For example, tags 340 and 350 can be for targeted advertisements, social media or news feeds, services, content, and/or data that are not generated by the content publisher of the primary content.

Server 150-1 may determine that tags 340 and 350 fall within initial presentation 330 based on the placement and/or location of the tags in the primary content. For instance, server 150-1 may determine that tags 340 and 350 are the first two tags specified within the primary content, and that the first two tags typically fall within initial presentation 330. Server 150-1 may also determine placement and/or location of tags 340 and 350 based on an amount of other content preceding or following tags 340 and 350, a virtual rendering of the primary content by server 150-1, style sheet definitions, and/or other content object modeling.

In response to the request and identifying tags 340 and 350 to secondary content included as part of initial presentation 330, server 150-1 may select secondary content for tags 340 and 350 from a set of secondary content that is cached within distribution point 110-1 or origin storage 115. Server 150-1 may target the selection of the secondary content based on a location associated with distribution point 110-1. In other words, server 150-1 may select geographically relevant secondary content for users operating in locations optimally served by distribution point 110-1. Server 150-1 may then provide (at 2) the requested primary content and the selected secondary content for initial presentation 330 to client device 140-1. In this figure, server 150-1 may remove tags 340 and 350 from the primary content, and may directly embed data for the selected and targeted secondary content in place of tags 340 and 350.

Server 150-1, as part of the progressive delivery of secondary content, does not however modify any tags for secondary content falling outside initial presentation 330. Accordingly, client device 140-1 may obtain secondary content that is outside initial presentation 330, but that is nevertheless integrated as part of the primary content from third-party content providers 310 and 320. Client device 140-1 may submit (at 3) a first request to third-party content provider 310, and may submit (at 3') a second request to third-party content provider 320 based on tags defined for the subsequent secondary content in the primary content.

Third-party content providers 310 and 320 may perform (at 4 and 4') a relatively slow selection operation to select targeted secondary content for client-device 140-1 based on user specific (e.g., age, income range, and/or preferences) and/or session specific information (e.g., prior search history, prior purchase history, cart information, location, etc.) obtained for a user of the client device 140-1 and/or client device 140-1, and/or a real-time bidding process. Third-party content provider 310 may then provide (at 5) the secondary content targeted on the obtained user and/or session specific information to client device 140-1, and third-party content provider 320 may provide (at 5') additional secondary content to client 140-1.

Figure 4:
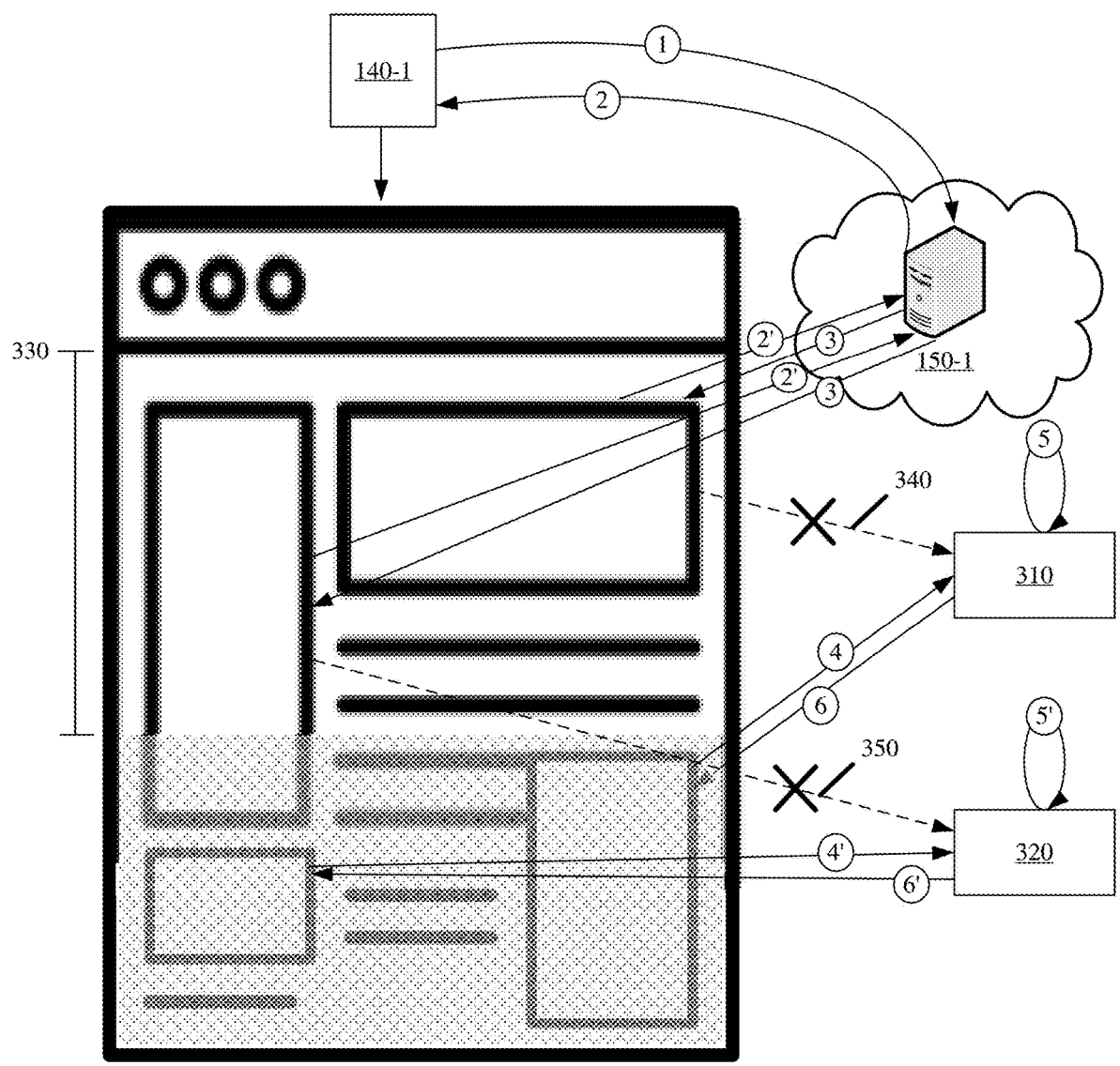
FIG. 4 conceptually illustrates an alternative progressive delivery of targeted secondary content with a first set of secondary content for an initial presentation of primary content being provided by the distributed platform, and a second set of secondary content for a remaining presentation of the primary content being provided by one or more third-party content providers.

FIG. 4 conceptually illustrates an alternative progressive delivery of targeted secondary content with a first set of secondary content for an initial presentation of primary content being provided by the distributed platform, and a second set of secondary content for a remaining presentation of the primary content being provided by one or more third-party content providers. Here again, client device 140-1 may issue (at 1) a request for primary content that is routed to server 150-1.

In response to the request, server 150-1 may obtain a base HTML page for the requested primary content. Server 150-1 may parse the HTML page in order to identify and modify tags 340 and 350 to secondary content that fall within initial presentation 330 of the requested primary content. For instance, server 150-1 may replace tags 340 and 350 for retrieving secondary content from third-party content providers 310 and/or 320 with tags for retrieving the same, similar, or substitute targeted secondary content from distributed platform 100 (e.g., server 150-1). This may include changing the domain name, URL, and/or other addressing for tags 340 and 350. Server 150-1 may then provide (at 2) the HTML page with the modified tags to client device 140-1.

Upon receiving the HTML page with the modified tags, client device 140-1 may begin requesting content associated with the tags in the HTML page. For instance, client device 140-1 may issue requests for primary content (e.g., images, text, media, applications, services, etc.) to server 150-1 based on tags in the HTML page linking to the primary content. Similarly, client device 140-1 may issue (at 2') requests for targeted secondary content that is integrated into initial presentation 330 to server 150-1 based on the modified tags in the HTML page. Client device 140-1 may issue the requests for all content of initial presentation 310 over the existing connection between client device 140-1 and server 150-1 that was used to request (at 1) the HTML page.

Server 150-1 may provide the requested primary content to client device 140-1. Server 150-1 may also select and provide (at 3) targeted secondary content to client device 140-1 in response to the requests issued (at 2') as a result of the modified tags in the earlier provided (at 2) HTML page. Here again, server 150-1 may select geographically relevant secondary content based on one or more locations associated with distribution point 110-1. For instance, the targeted secondary content may be stored and returned from one or more advertising campaigns that are active at distribution point 110-1 from which server 150-1 operates, and that are relevant to client device 140-1 based a location of distribution point 110-1 or the routing of requests from client devices (e.g., client device 140-1) from adjacent regions to distribution point 110-1.

Client device 140-1 may then render initial presentation 330 using only the primary content and targeted secondary content provided by server 150-1, while concurrently or simultaneously establishing connections with third-party content providers 310 and 320 and requesting (at 4 and 4') secondary content falling outside initial presentation 310 from third-party content providers 310 and 320.

Third-party content providers 310 and 320 may select (at 5 and 5') targeted secondary content for client device 140-1. The selection (at 5 or 5') may be based on user and/or session specific information that third-party content providers 310 and 320 obtain for the user associated with client device 140-1, and/or client device 140-1. The selection (at 5 or 5') may alternatively be based on a real-time bidding process. Third-party content providers 310 and 320 may provide (at 6 and 6') client device 140-1 with selected secondary content for integration as part of the primary content falling outside initial presentation 330.

In FIGS. 3 and 4, rendering of initial presentation 330 may be accelerated by providing the primary content and one or more targeted secondary content falling within initial presentation 330 from distributed platform 100, and more specifically, server 150-1 operating in distribution point 110-1 of distributed platform 100. All content for initial presentation 330 may therefore be provided without accessing slower performing third-party content providers 310 or 320 that may be more distant and have slower performing resources than distribution point 110-1, and may be provided without establishing different network connections in order to retrieve the primary content separate from the secondary content. Moreover, the selection of relevant secondary content for initial presentation 330 is also accelerated by simplifying the selection based on the location of distribution point 110-1 to which client device 140-1 requests are routed and content is provided. Other secondary content may be selected based on more specific user and/or session information, and varied based on more complicated real-time bidding processes performed by third-party content providers 310 and 320.

Figure 5:
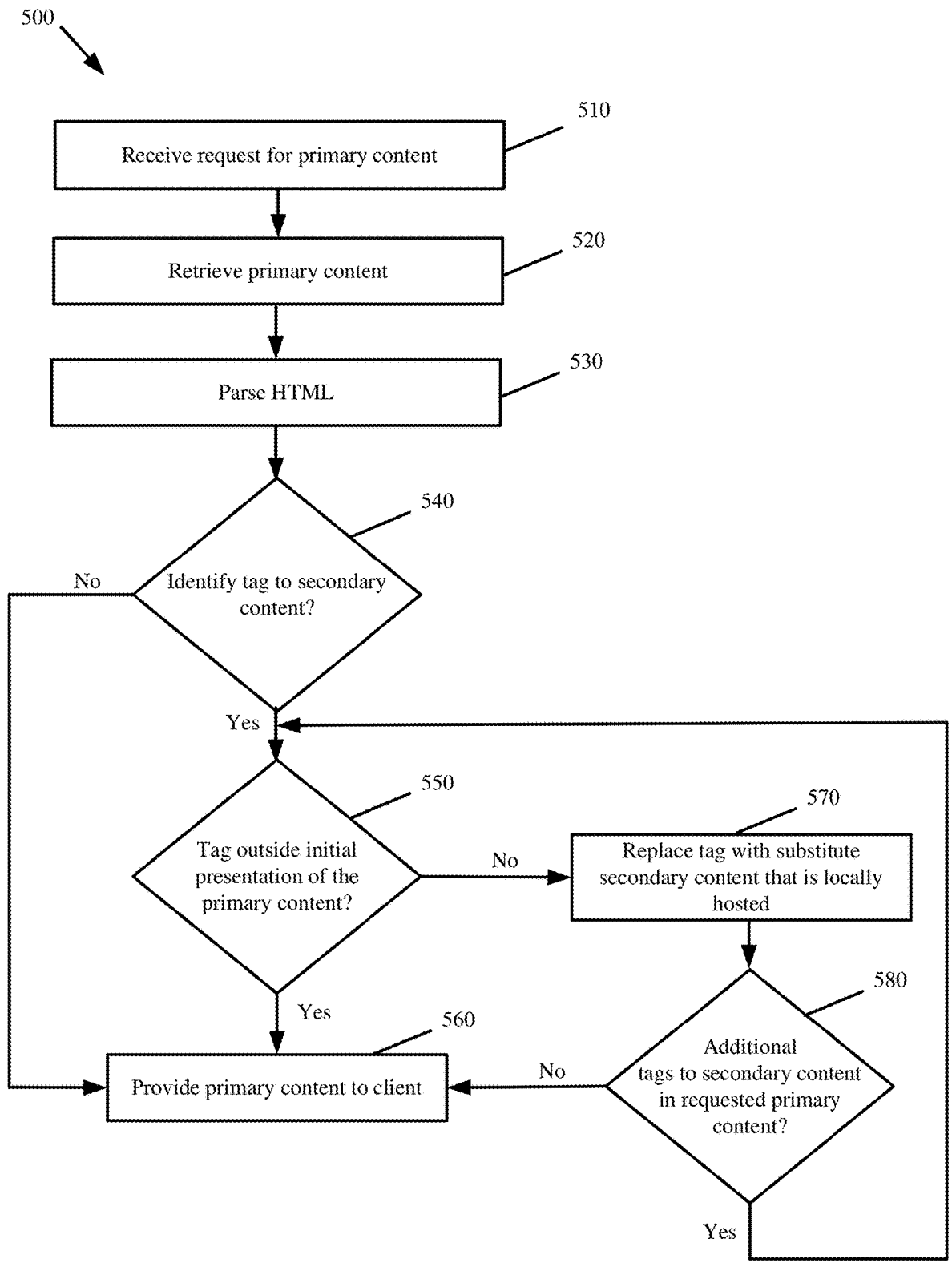
FIG. 5 presents a process for performing the progressive delivery of targeted secondary content from a distributed platform server in accordance with some embodiments.

FIG. 5 presents process 500 for performing the progressive delivery of targeted secondary content with server 150-1 in accordance with some embodiments. Process 500 may include receiving (at 510) a request for primary content at server 150-1 operating from distribution point 110-1 of distributed platform 100. One or more traffic management devices 120 may route the request from client device 140-1 to distribution point 110-1 because distribution point 110-1 is determined to be the optimal distribution point (e.g., fewest number of network hops, least congestion, least latency, etc.) for client device 140-1.

Process 500 may include retrieving (at 520) the requested primary content. The primary content may be retrieved from origin storage 115, from local cache of server 150-1, a peer cache of another server 150 of distributed platform 100, and/or a server of the content publisher. The retrieved primary content may include a base HTML page that defines the framework, layout, and tags, links, and/or other references to the objects that form the primary content. In some embodiments, retrieving (at 520) the requested primary content may include retrieving one or more objects provided by the content publisher in addition to or instead of the base HTML page.

Process 500 may include parsing (at 530) the HTML page (e.g., retrieved primary content), and determining (at 540), based on the parsing (at 530), whether the HTML includes one or more tags to secondary content (e.g., content with domain names, URLs, and/or other addressing that is different than that of the content publisher). In some embodiments, the parsing may include identifying "href" attributes, scripts, and/or other code used to define the tags, links, and/or references to the secondary content and/or third-party content providers (e.g., content not provided by the content publisher). In some embodiments, the parsing (at 530) may include sequentially analyzing the HTML page to identify the tags to the secondary content.

In response to determining (at 540—No) that there no tags for integrating secondary content into the requested primary content, process 500 may include providing (at 560) the retrieved primary content to client device 140-1 in response to the received (at 510) request. When there is no integrated secondary content, the progressive delivery is unnecessary, and the server may send the HTML page or primary content without modification to client device 140-1.

In response to determining (at 540—Yes) that the primary content includes a tag to secondary content, process 500 may include determining (at 550) if the tag falls outside an initial presentation of the requested primary content. Tags may be determined to fall outside or within an initial presentation based on a configurable initial presentation definition and/or the placement and/or location of the tags in the primary content. For instance, the initial presentation may be defined to include, by default, the first two tags that appear in the content publisher HTML page and that are directed to third-party content. Other embodiments may rely on a more specific definition of the initial presentation. For instance, the initial presentation may include the content that is initially rendered and presented on client device 140-1, and/or the content that is presented within a specified number of pixels. To determine if the identified tag falls within this definition of the initial presentation, server 150-1 may virtually render the primary content to determine placement of the secondary content in the virtual rendering. The virtual rendering may identify specific or relative positions for the secondary content in the primary content. The virtual rendering may include constructing the Document Object Model ("DOM") for the primary content.

In response to determining (at 550—No) that the identified tag does not fall outside the initial presentation, and therefore impacts the initial presentation, process 500 may include replacing (at 570) the tag to the third-party content provider in the HTML page. Server 150-1 may replace (at 570) the tag to the third-party content provider with a tag to the same, similar, or substitute secondary content that is locally hosted and served from distribution point 110-1. For instance, the original tag may specify an advertisement for a particular manufacturer. The process may include replacing the original tag with a tag to a regionally specific advertisement for the particular manufacturer, wherein the regionally specific advertisement is stored at distribution point 110-1 and is part of an active advertising campaign being performed by distributed platform 100 at distribution point 110-1. The regionally specific advertisement is relevant and targeted for the geographic region that is serviced by distribution point 110-1. Accordingly, the regionally specific advertisement will be geographically relevant and targeted to client device 140-1 and other client devices that are routed to distribution point 110-1. As another example, the original tag may specify obtaining a targeted advertisement from a specific advertising platform that uses a real-time bidding process to select targeted advertisements from active campaigns. Here again, process 500 may include replacing the original tag with a tag to one or several regionally specific advertising campaigns being performed by distributed platform 100 at distribution point 110-1.

Replacing (at 570) the tag may include removing an href, a script (e.g., JavaScript), or other code that was originally used in the primary content to retrieve the secondary content from a specific third-party content provider. Replacing (at 570) the tag may further include adding an href, in place of the removed href, script, or other code, to retrieve the substitute secondary content from the distributed platform, and more specifically from the same distribution point 110 that provides the primary content to requesting client device 140-1. In some embodiments, server 150-1 may replace (at 570) the tag to the third-party content provider with data for secondary content selected by server 150-1. In some such embodiments, server 150-1 embeds the targeted secondary content into or as part of the HTML page.

Process 500 may further include determining (at 580), based on the parsing (at 530), if the requested primary content includes additional tags to secondary content after replacing (at 570) the current tag. In response to determining (at 580—No) that no additional tags to third-party content remain, process 500 may include providing (at 560) to client device 140-1, the retrieved primary content as modified to replace (at 570) tags to secondary content affecting the initial presentation of the requested primary content. In response to determining (at 580—Yes) that one or more additional tags to secondary content remain, process 500 may include determining (at 550) if the next tag falls outside the initial presentation.

Once a tag to secondary content is determined (at 550—Yes) to fall outside the initial presentation, process 500 can determine that all other remaining tags to secondary content coming after the current tag in the HTML also fall outside the initial presentation, and that no further modification of the requested primary content is needed. Accordingly, process 500 may include providing (at 560) to client device 140-1, the retrieved primary content as modified to replace (at 570) tags to secondary content affecting the initial presentation of the requested primary content.

In some embodiments, distributed platform 100 may perform an active campaign based on distributed platform 100 receiving one or more advertisements from an advertiser that distributed platform 100 is to serve to client devices 140 operating in one or more geographic regions that the advertiser selects for the one or more advertisements. The geographic regions may be specified with any desired granularity. For example, an active campaign may include different advertisements for the east and west coasts of the United States of America. A different campaign may include different advertisements for individual states, zip codes, and/or other areas.

Each active campaign may be defined with a desired number of impressions or views for the one or more advertisements of that campaign. Each active campaign may also be temporally restricted. For example, the advertisements of a particular active campaign may be valid for delivery up to a specific date and/or time. As another example, an active campaign may specify a first advertisement for a first geographic region during a first time, and a second advertisement for the first geographic region during a different second time. Other restrictions based on information or data that is available to servers 150 of distributed platform 100 may also be used to refine the scope of a campaign. For example, the user agent field provided with client device 140 requests may be used to restrict campaigns to specific applications, operating systems, software vendors, software versions, and/or specific devices. Other information with which servers 150 may internally select targeted secondary content without added delay may include the Internet Service Provider ("ISP"), client device 140 subnet, Autonomous System ("AS") number, and/or other network data. Accordingly, distribution point 110-1 may include a first campaign with targeted secondary content that is geographically relevant for a first set of client devices 140 requesting and receiving content from distribution point 110-1, and may further include a second campaign with targeted secondary content that is geographically relevant for a different second set of client devices 140 requesting and receiving content from distribution point 110-1, wherein the first and second sets of client devices 140 may be differentiated based on user agent information (e.g., iOS device versus Android devices).

Distributed platform 100 may complete an active campaign by decrementing the number of impressions each time a server 150 of distributed platform 100 provides the advertisement to a client device 140 in the selected one or more geographic regions. Once the count for the number of impressions or confirmed deliveries reaches zero, the campaign may be complete, and may be deactivated (e.g., no longer served).

Figure 6:
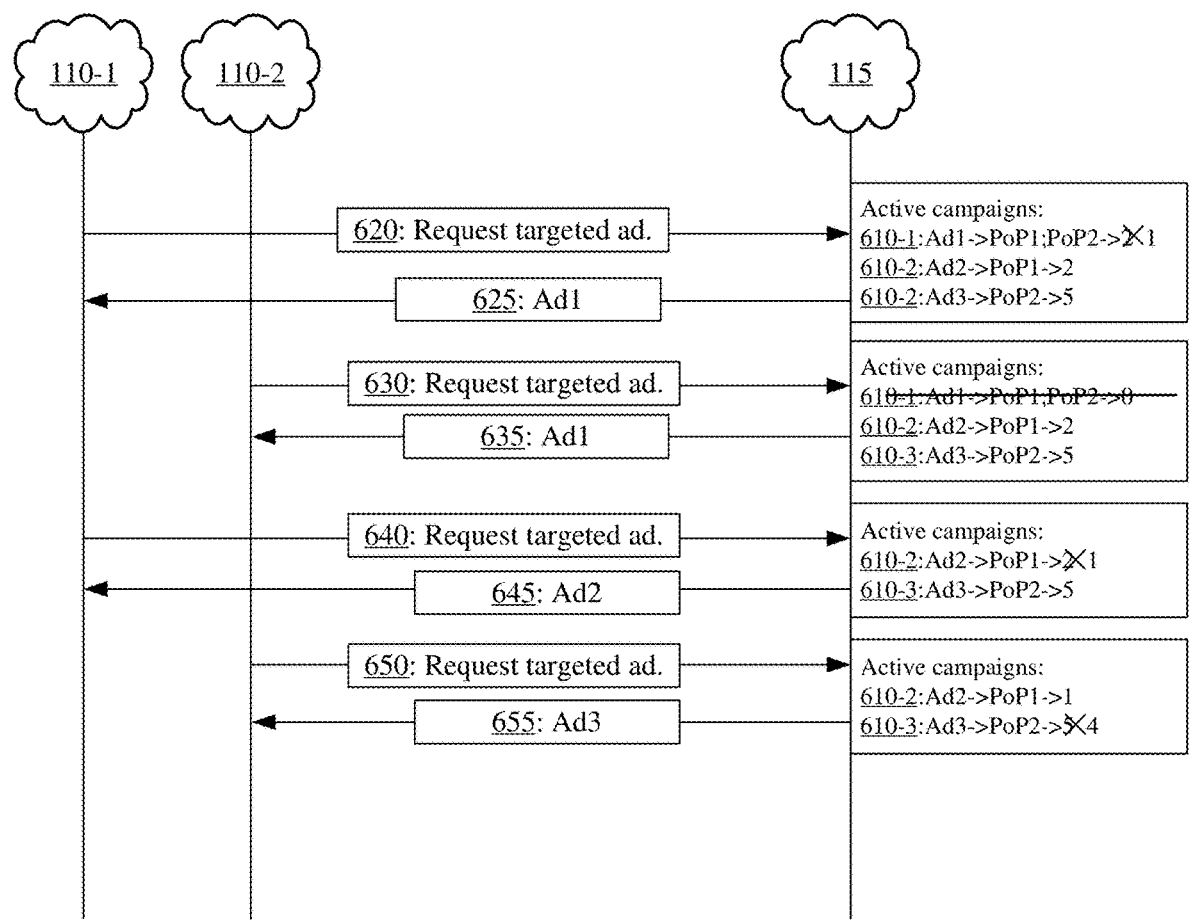
FIG. 6 conceptually illustrates the distributed platform performing an active campaign in accordance with some embodiments.

FIG. 6 conceptually illustrates distributed platform 100 performing an active campaign in accordance with some embodiments. FIG. 6 illustrates first distribution point 110-1, second distribution point 110-2, and origin storage 115 of distributed platform 100 operating to complete three different advertising campaigns 610-1, 610-2, and 610-3.

First distribution point 110-1 may include one or more servers (e.g., 150-1) that respond to requests and provide content to client devices 140 that operate within a first set of geographic regions surrounding first distribution point 110-1. Second distribution point 110-2 may include one or more servers (e.g., 150-2) that respond to requests and provide content to client devices 140 that operate within a different second set of geographic regions surrounding second distribution point 110-2. Origin storage 115 may store the advertisements and information related to active campaigns 610-1, 610-2, and 610-3.

Campaign 610-1 may correspond to a first advertisement that is relevant for users and/or client devices 140 operating from the first and second sets of geographic regions serviced by first distribution point 110-1 and second distribution point 110-2, and may specify a campaign requesting two impressions or views for the advertisement. Campaign 610-2 may correspond to a second advertisement that is relevant for users and/or client devices 140 operating from the first set of geographic regions serviced by first distribution point 110-1, and may specify a campaign requesting two impressions or views for the advertisement. Campaign 610-3 may correspond to a third advertisement that is relevant for users and/or client devices 140 operating from the second set of geographic regions serviced by second distribution point 110-2, and may specify a campaign requesting five impressions or views for the advertisement. Campaigns 610-1, 610-2, and 610-3 are shown for example purposes. Distributed platform 100 may support additional campaigns and/or campaigns with different criteria (e.g., impressions, temporal restrictions, and/or other campaign restrictions).

FIG. 6 illustrates first distribution point 110-1 providing (at 620) a first request for a targeted advertisement for a client device (not shown) to origin storage 115. The request may be sent in response to first distribution point 110-1 receiving a request for a targeted advertisement from the client device based on a rewritten tag in a base HTML page for primary content provided to the client device, or in response to the client device requesting a base HTML page that contains a tag to a targeted advertisement.

Since the first request originates from first distribution point 110-1 and/or a client device operating from a first set of geographic regions serviced by first distribution point 110-1, a relevant targeted advertisement for the first request may be obtained from campaign 610-1 or campaign 610-2. As shown in FIG. 6, origin storage 115 selects the first advertisement from first campaign 610-1 for the first request, decrements a count associated with campaign 610-1, and provides (at 625) the selected first advertisement to first distribution point 110-1. First distribution point 110-1 may then provide the targeted first advertisement to the requesting client device in response to a request for a targeted advertisement from the client device, or may integrate the targeted first advertisement into a base HTML page that is requested by the client device in place of a tag for a targeted advertisement.

Second distribution point 110-2 may then provide (at 630) a second request for a targeted advertisement to origin storage 115. Since the second request originates from second distribution point 110-2, a relevant targeted advertisement for the second request may be obtained from campaign 610-1 or campaign 610-3.

Origin storage 115 may perform a round-robin selection or random selection of advertisements from qualifying campaigns. For instance, a last targeted advertisement was selected from campaign 610-1 for the first request, so origin storage 115 may avoid selecting a targeted advertisement from campaign 610-1 in response to the second request. Alternatively, origin storage 115 may continually select advertisements from a same qualifying campaign in order to complete that campaign before selecting a targeted advertisement from another campaign.

FIG. 6 illustrates origin storage 115, once again, selecting the first advertisement from first campaign 610-1 for the second request in order to complete campaign 610-1 (e.g., decrement the count associated with campaign 610-1 to zero), and providing (at 635) the selected first advertisement to second distribution point 110-2. Now that campaign 610-1 is complete, origin storage 115 may remove campaign 610-1 from its list of active campaigns, and may stop selecting and/or providing the first advertisement associated with campaign 610-1 in response to requests for targeted secondary content or advertisements.

Accordingly, when first distribution point 110-1 sends (at 640) a third request for a targeted advertisement to origin storage 115, origin storage 115 may select and provide (at 645) the second advertisement from second campaign 610-2. Similarly, when second distribution point 110-2 sends (at 650) a fourth request for a targeted advertisement to origin storage 115, origin storage 115 may select and provide (at 655) the third advertisement from third campaign 610-3.

In some embodiments, origin storage 115 may prioritize the selection of first targeted secondary content over second targeted secondary content based on greater fees that were paid to prioritize delivery of the first targeted secondary content over the second targeted secondary content. In some embodiments, origin storage 115 may be removed from the targeted secondary content selection. In some such embodiments, targeted secondary content that is relevant for each distribution point 110 is cached by one or more servers 150 at each of distribution points 110. Information for a campaign that is active across multiple distribution points 110 may be shared between distribution points 110. Alternatively, the campaign may be partitioned to each relevant distribution point 110 with each distribution point 110 completing its portion of the campaign. For instance, a campaign may specify a total of one hundred impressions and/or views, and may be relevant for the geographic regions that are serviced by first distribution point 110-1 and second distribution point 110-2. In this case, first distribution point 110-1 may be assigned the campaign, and may be tasked with serving fifty impressions of the campaign. Second distribution point 110-2 may be assigned the same campaign, and may be tasked with serving the other fifty impressions of the campaign. One or more servers 150 in each of first distribution point 110-1 and second distribution point 110-2 may store the targeted secondary content associated with the campaign, and/or may manage the campaign information (e.g., remaining impressions).

The server selected for storing targeted secondary content for a campaign, and/or managing the information for that campaign may be a server that is selected based on a hash of a tag (e.g., URL). The hashed tag may be used to request targeted secondary content from distributed platform 100, a corresponding distribution point 110, or a specific server of distributed platform 100. The hashed tag may be inserted into primary content (e.g., a base HTML page) in place of a tag originally directed to a third-party content provider. In some embodiments, a single server may be designated in each distribution point 110 to serve secondary content for all campaigns that are relevant to that distribution point 110. In some other embodiments, different servers may be designated in each distribution point 110 to serve targeted secondary content for different campaigns that are relevant to that distribution point 110.

The progressive delivery of the targeted secondary content by distributed platform 100 provides advantages for content publishers and third-party content providers. The delivery and initial presentation of primary content with integrated secondary content is accelerated, allowing content publishers the ability to monetize their content without compromising the client device experience or performance afforded by distributed platform 100. Moreover, third-party content providers also benefit based on the geographically relevant targeting of their secondary content and faster distribution of their secondary content by distributed platform 100. Also, advertisement and/or other content blockers running on client devices may be defeated because secondary content for the initial presentation is now provided by distributed platform 100 instead of from third-party content providers that may be blacklisted by the advertisement and/or other content blockers. The progressive delivery may also integrate the secondary content into the primary content such that these and other blocking tools may be unable to differentiate secondary content from the primary content.

Server, device, and machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 7:
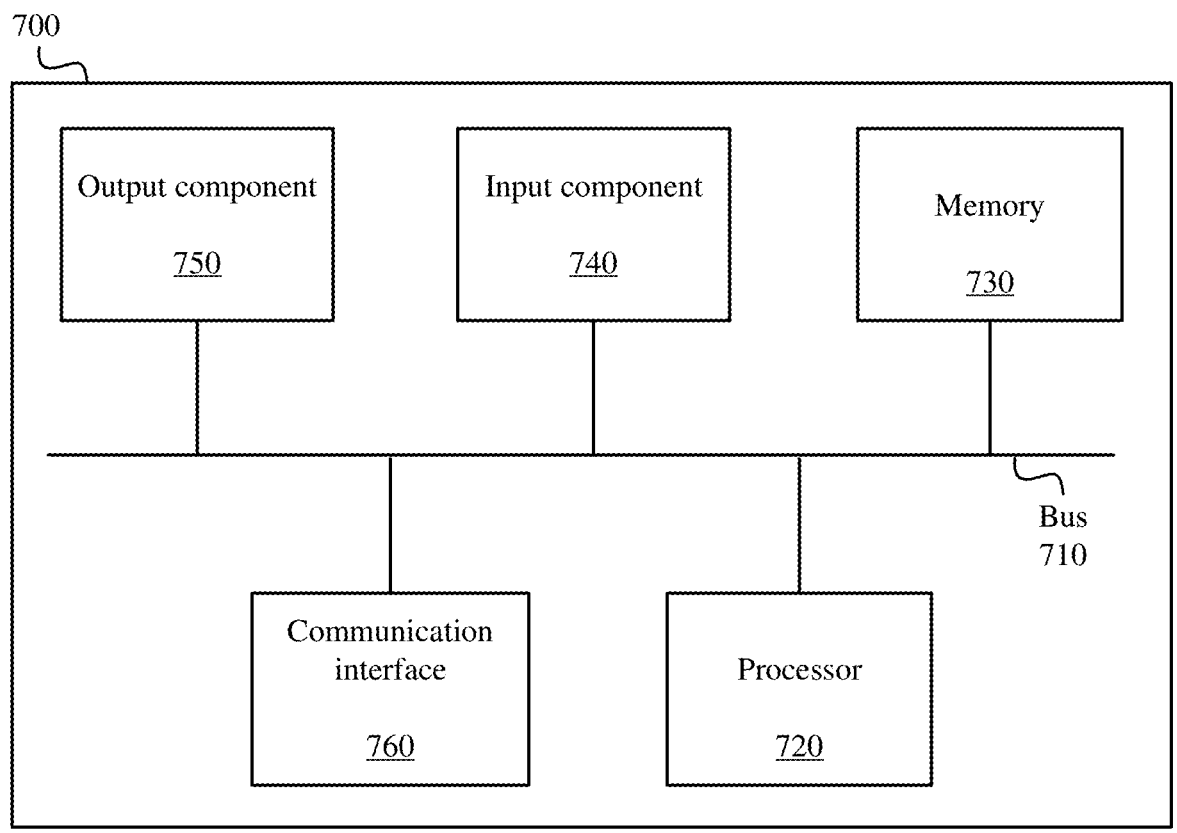
FIG. 7 illustrates example components of one or more devices, according to one or more embodiments described herein.

FIG. 7 is a diagram of example components of device 700. Device 700 may be used to implement certain of the devices described above (e.g., traffic management devices 120, servers of PoPs 110, origin storage 130, and client device 140). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
retrieving a base page of a first content provider to a first distribution point of a distributed platform in response to a request from a client device, wherein the distributed platform comprises a plurality of distribution points;
determining that the base page comprises at least a first original tag to first content of a different second content provider and a second original tag to different second content, and wherein the second original tag is located after the first original tag in the base page;
determining that the first content is at a first vertical position within an initial presentation of the base page and that the second content is at a lower second vertical position within a remaining presentation of the base page, wherein the initial presentation corresponds to a first display area that is visible upon rendering the base page, wherein the remaining presentation corresponds to a second display area that is not visible upon rendering the base page, and wherein the remaining presentation becomes visible after moving past the first display area;
selecting first substitute content, as a substitute for the first content in the initial presentation, from a plurality of substitute content based on a location of the first distribution point; and
providing, to the client device, the base page and the first substitute content from the first distribution point, in place of the first content from the second content provider, and the second content for the second original tag, that is within the remaining presentation, from a site other than the first distribution point.

2. The method of claim 1 further comprising decrementing a count associated with the first substitute content in response to said providing.

3. The method of claim 2 further comprising reselecting the first substitute content as a substitute for the first content in response to a second request for the base page and in response to the count being greater than zero.

4. The method of claim 3 further comprising selecting different second substitute content, as a substitute for the first content, based on the location of the first distribution point and in response to the second request for the base page and the count being equal to zero.

5. The method of claim 1 further comprising routing the request from the client device to the first distribution point based on the first distribution point being a closest distribution point of the plurality of distribution points to the client device.

6. The method of claim 1, wherein said providing comprises providing the base page with a new tag, in place of the first original tag, in response to the request from the client device, and providing the first substitute content from the first distribution point to the client device in response to a subsequent request from the client device that is directed to the new tag.

7. The method of claim 1, wherein said determining that the first content is within the initial presentation comprises identifying the first original tag to be amongst a first set of tags of the base page and the second original tag to be amongst a second set of tags that is specified after the first set of tags in the base page.

8. The method of claim 1, wherein said determining that the first content is within the initial presentation comprises identifying the first content to fall within a specific number of pixels of the first display area, and the second content to fall within pixels that are below the specific number of pixels of the first display area.

9. The method of claim 1 further comprising receiving the request at a server operating from the first distribution point, and wherein the first distribution point is a particular point-of-presence ("PoP") of a plurality of PoPs of the distributed platform.

10. The method of claim 1 further comprising receiving at the first distribution point, a request for the second content associated with the second original tag.

11. The method of claim 10 further comprising selecting a targeted advertisement, from a plurality of advertisements, that is geographically relevant to one or more regions serviced by the first distribution point, and providing the targeted advertisement in response to the request for the second content associated with the second original tag.

12. The method of claim 1, wherein the base page is a HyperText Markup Language ("HTML") page, and wherein the method of claim 1 further comprises identifying the first original tag and the second original tag from parsing the HTML page.

13. A device operating from a first distribution point of a plurality of distribution points of a distributed platform, the device comprising:
one or more processors configured to:
retrieve a base page of a first content provider in response to a request from a client device;
determine that the base page comprises at least a first original tag to first content of a different second content provider and a second original tag to different second content, and wherein the second original tag is located after the first original tag in the base page;
determine that the first content is at a first vertical position within an initial presentation of the base page and that the second content is at a lower second vertical position within a remaining presentation of the base page, wherein the initial presentation corresponds to a first display area that is visible upon rendering the base page, wherein the remaining presentation corresponds to a second display area that is not visible upon rendering the base page, and wherein the remaining presentation becomes visible after moving past the first display area;
selecting first substitute content, as a substitute for the first content in the initial presentation, from a plurality of substitute content based on a location of the first distribution point; and
provide, to the client device, the base page and the first substitute content from the first distribution point, in place of the first content from the second content provider, and the second content for the second original tag, that is within the remaining presentation, from a site other than the first distribution point.

14. A non-transitory computer-readable medium, storing a plurality of processor-executable instructions to:
retrieve a base page of a first content provider in response to a request from a client device;
determine that the base page comprises at least a first original tag to first content of a different second content provider and a second original tag to different second content, and wherein the second original tag is located after the first original tag in the base page;
determine that the first content is at a first vertical position within an initial presentation of the base page and that the second content is at a lower second vertical position within a remaining presentation of the base page, wherein the initial presentation corresponds to a first display area that is visible upon rendering the base page, wherein the remaining presentation corresponds to a second display area that is not visible upon rendering the base page, and wherein the remaining presentation becomes visible after moving past the first display area;
selecting first substitute content, as a substitute for the first content in the initial presentation, from a plurality of substitute content based on a location of the first distribution point; and
provide, to the client device, the base page and the first substitute content from the first distribution point, in place of the first content from the second content provider, and the second content for the second original tag, that is within the remaining presentation, from a site other than the first distribution point.

* * * * *